March 17, 1942.   F. H. BOOR   2,276,821
DIFFERENTIAL MECHANISM
Filed Feb. 6, 1941   2 Sheets-Sheet 1

INVENTOR.
Francis H. Boor
BY Woodling and Krost attys

Patented Mar. 17, 1942

2,276,821

UNITED STATES PATENT OFFICE 2,276,821

DIFFERENTIAL MECHANISM

Francis H. Boor, La Fayette, Ind., assignor to Fairfield Manufacturing Company

Application February 6, 1941, Serial No. 377,712

13 Claims. (Cl. 74—315)

My invention relates in general to differential mechanisms and more particularly to a differential mechanism having the provision of resisting the rotation of the differential gears against differential movement when the power transmitted to the differential gears tends to spin one of the axles with relation to the other.

An object of my invention is the provision of a differential gearing which generally conforms to the conventional embodiment of a differential mechanism but which includes additional means for resisting the differential gears against differential movement when the power transmitted to the differential gears tends to spin one of the axles with relation to the other.

Another object of my invention is the provision of retaining the good and efficient features of a conventional differential mechanism and of providing in addition thereto the arrangement of resisting the differential gears against differential movement when the power transmitted to the differential gears tends to spin one of the axles with relation to the other.

Another object of my invention is the provision of a differential of the above specified type which is rugged in construction and which will withstand a considerable amount of hard usage.

Another object of my invention is the provision of mounting my improved feature which resists the differential gears against differential movement upon either one or both sides of the differential mechanism.

Another object of my invention is the provision of mounting the new feature of my invention which resists the differential gears against differential movement upon one side of the differential mechanism and thereby allow space upon the other side of the differential mechanism for a gear reduction driving means having a gear operating at a relatively close clearance to the differential case and in a plane substantially perpendicular to the axles.

Other objects and a fuller understanding of my invention may be had by referring to the following description and claims, taken in conjunction with the accompanying drawings, in which:

Figures 1, 2:
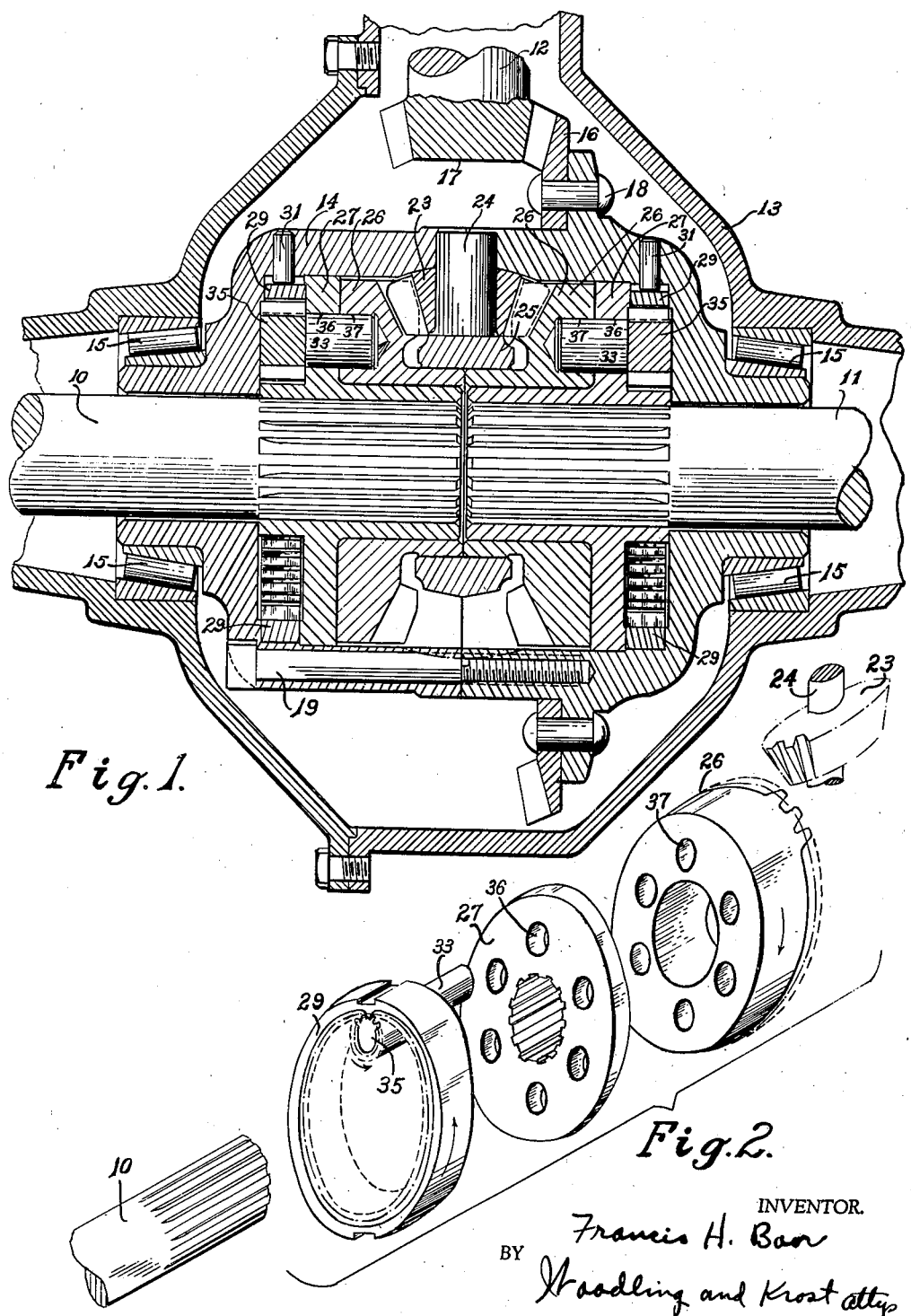
Figure 1 represents a cross-sectional view of a differential mechanism embodying the features of my invention.
Figure 2 is a perspective and exploded view of the cooperating parts of my differential mechanism.

With reference to Figures 1 and 2 of the drawings, my invention is arranged to drive two axles 10 and 11 by means of a power driven shaft 12. The entire differential mechanism is rotatively mounted within a housing 13 upon roller bearings 15. The differential case is designated by the reference character 14 and is arranged to be rotated or driven upon the roller bearings 15 by means of a ring gear 16 which meshes with a drive pinion 17 upon the power driven shaft 12. The ring gear 16 may be fastened to the differential case 14 in any suitable manner such, for example, as illustrated by rivets 18. The differential case 14 may be constructed in two parts and, as illustrated, the two parts are secured together by means of bolts 19.

Centrally positioned within the differential case 14 is a spider core ring 25 having radially extending spider shafts 24 upon which are rotatively mounted spider pinions 23. The construction of the spider core ring 25, the spider shafts 24 and the spider pinions 23 are substantially in accordance with those found in conventional differential mechanisms. As illustrated, compensating gears 26 are mounted within the differential case 14 upon opposite sides of the spider pinion 23. The compensating gears 26 and the spider pinions 23 have teeth which intermesh with each other and the cooperative function performed by the compensating gears 26 and the spider pinions 23 are the same as those performed in a conventional differential, with the exception that the compensating gears 26 are not directly connected to the axles. Positioned upon opposite sides of the compensating gears 26 are drive connecting flanges 27 which are suitably splined or otherwise connected to the said axles 10 and 11. The drive connecting flanges 27 are provided with central hub portions upon which the compensating gears 26 are mounted. As shown, the compensating gears 26 and the drive connecting flanges 27 have side surfaces disposed face to face and have round registered openings 37 and 36 therein, respectively. The registering openings 36 and 37 are disposed radially externally of the axle and are arranged circumferentially about the compensating gears and the drive connecting flanges 27. For the purpose of my invention, any suitable number of registering openings may be provided.

Rotatively mounted within the registering openings are round connecting pins 33 which provide a mechanical driving connection between the compensating gears and the drive connecting flanges. The outer ends of the round connecting pins are provided with pinion gears 35 which intermesh with an internal gear 29 which is non-rotatively connected to the differential case 14 by any suitable means such, for example, as by a locking pin 31 secured in the differential case 14 and fitting into a slot provided in the peripheral surface of the internal gear 29. The arrangement for the left-hand side of the differential mechanism as shown in Figure 1 is diagrammatically shown in Figure 2 which is helpful in understanding the operation of my differential mechanism.

In operation, when the wheels that are driven by the axles 10 and 11 have substantially the same traction then my differential mechanism operates the same as that of the conventional differential mechanism, in that the power from the power driven shaft 12 is transmitted through the drive pinion 17 to the ring gear 16, the differential case 14, the spider shafts 24, the spider pinions 23, the compensating gears 26, the round connecting pins 33, the drive connecting flanges 27, and through the spline connection to each of the shafts 10 and 11.

In explaining the operation of my differential mechanism when the differential movement of the differential gears is arrested or resisted, let it be assumed that the axle 10 tends to spin with reference to the axle 11. Under this assumed condition the compensating gear 26 on the left-hand side of the differential mechanism tends to turn at a greater speed than that of the differential case 14 and the internal gear 29 which is non-rotatively connected thereto. In other words, relative movement tends to exist between the compensating gear 26 and the internal gear 29 as shown in Figure 2 of the drawings. In order that this relative movement between the compensating gear 26 and the internal gear 29 may take place, the pinion gear 35 must rotate in a counter-clockwise direction as shown in Figure 2. The rotation of the gear pinion 35 causes the round connecting pin 33 to rotate in the registering openings 36 and 37. The pin 33 resists rotation because of the friction between the pin and the registering openings 36 and 37. The resistance to rotation is relatively great because of the driving pressure existing between the pin 33 and the registering openings 36 and 37. The greater the driving pressure the greater the frictional resistance to rotation of the pin 33 with reference to the registering openings 36 and 37. The driving pressure is large when the relative movement between the compensating gear 26 and the internal gear 29 is large, being the situation when the axle 10 tends to spin with reference to the axle 11. Therefore, when the axle 10 tends to spin with reference to the axle 11 a large frictional resistance is set up to resist the rotation of the pin 33. This large frictional resistance against rotation of the pin 33 tends to prevent the pinion gear 35 from turning in a counter-clockwise direction, which means that the compensating gear is mechanically secured to the differential case 14. The mechanically tying of the compensating gear 26 on the left-hand side of the differential mechanism to the differential case 14 prevents the spider pinions 23 from rotating in which case power is transmitted to the axle 11 for driving same even though the wheel driven by the axle 10 is encountering substantially no traction.

A similar but reverse directional action takes place between the compensating gear 26 on the right-hand side of the differential mechanism and the differential case 14. Thus, for example, when the axle 10 tends to spin with reference to the axle 11, there is a tendency for relative movement between the compensating gear 26 and the internal gear 29 on the right-hand side of the differential mechanism, but the tendency for this relative movement is in the reverse direction. This tendency of relative movement in the reverse direction mechanically ties the compensating gear 26 on the right-hand side of the differential mechanism to the differential case which means that the differential case 14 aids also in driving the axle 11 through the internal gear 29, the pinion gear 35, the round connecting pin 33, the drive connecting flange 27 to the said axle 11. The driving force which resists the rotation of the pin 33 on the right-hand side of the differential mechanism results from the tendency of relative movement between the differential case 14 and the axle 11. Thus, the combination of the internal gear 29, the pinion gear 35 and the round connecting pin 33 on both sides of the differential mechanism tends to aid in causing the rotation of the differential case 14 to drive the axle 11 when the axle 10 tends to spin. Accordingly, I obtain a double locking or arresting action against differential movement when the power transmitted to the differential gears tends to spin one of the axles with relation to the other. The locking or arresting action may be also varied by changing the number of round connecting pins and pinion gears. Also, the effectiveness of the locking or arresting action may be greatly increased by making the diameter of the pinion gears 35 small in order to reduce the torque transmitted from the pinion gears 35 to the round connecting pins 33. As illustrated, the pinion gears 35 and the round connecting pins 33 are disposed radially externally of the axles in order that their effective distance from the center of the axle be as great as possible to produce an effective driving connection between the compensating gears 26 and the drive connecting flanges 27. The pinion gears 35 and the round connecting pins 33 may be made of one integral piece of metal with the teeth directly cut into the piece of metal.

Figure 3:
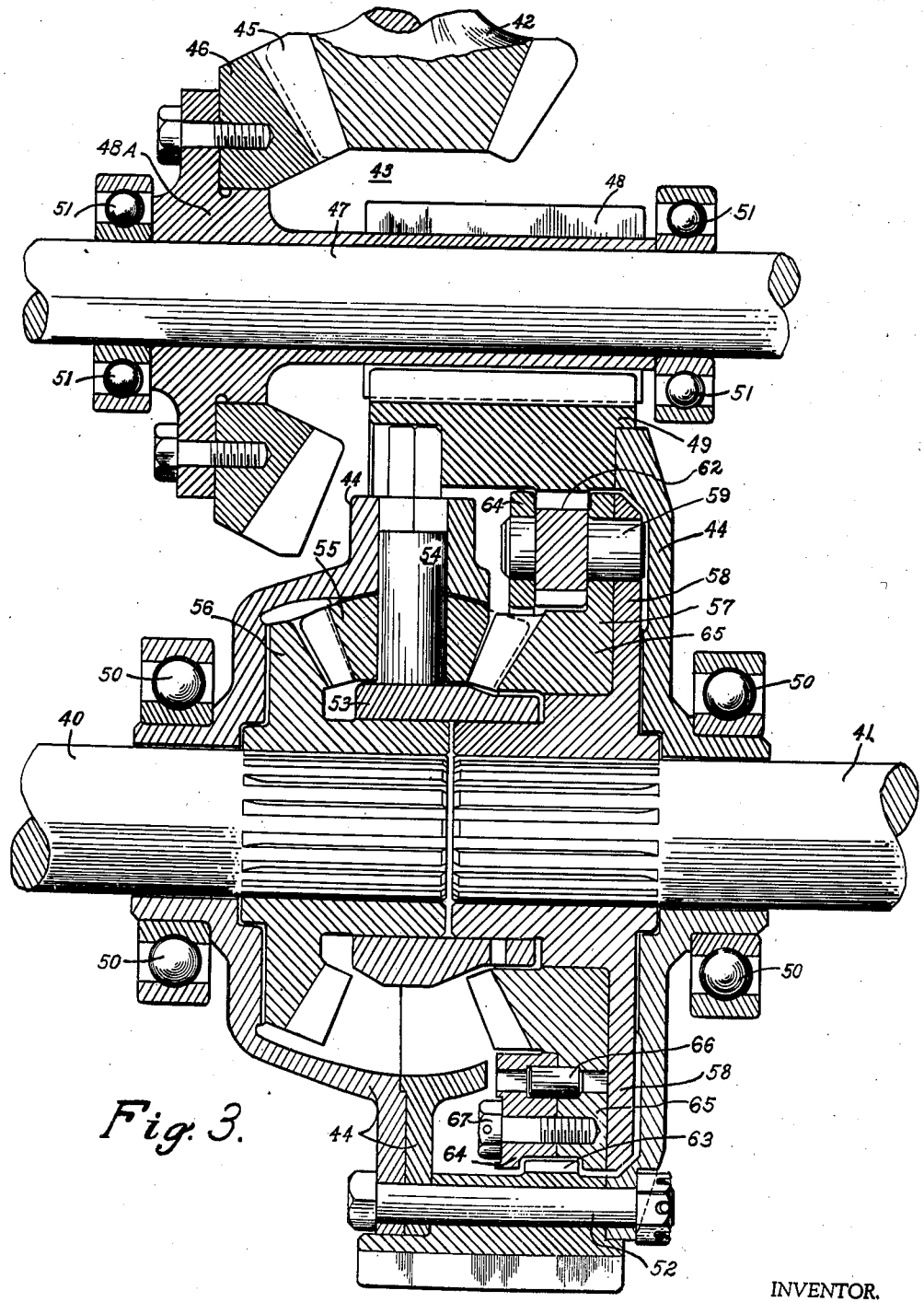
Figure 3 is a cross-sectional view of a modified form of my differential mechanism.

With reference to Figure 3 I show my arresting or locking feature embodied only in one side of the differential mechanism having a differential case 44 driven by a gear reduction drive arrangement indicated generally by the reference character 43. The power transmitted to the differential case 44 is received from a power driven shaft 42 in which the transmittal of the power flows from drive pinion teeth 45, a bevel gear 46, a pinion 48 made integral with a hub 48A and supported on an intermediate shaft 47 and an external gear 49 mounted externally of the differential case 44. The arrangement of the gearing between the power driven shaft 42 and the differential case 44 may be characterized as a double reduction drive unit or arrangement and is adapted to be used in connection with heavy duty loads.

The arrangement of the differential mechanism is substantially the same as that shown in Figure 1 of the drawings except that the locking or arresting feature of my invention is positioned only on one side of the differential mechanism, since the other side of the differential mechanism and the bevel gear 46 operate at relatively close clearances. The differential case 44 is rotatively mounted in bearings 50 suitably supported by a housing which is not shown. The intermediate shaft 47 may be supported by bearings 51 which in turn are mounted in a housing not shown. The external gear 49 may be secured non-rotatively to the said differential case 44 by means of bolts 52 which are disposed at spaced distances around the periphery of the differential case.

As illustrated in Figure 3, a spider core 53 having radially disposed spider shafts 54 is mounted slightly to the left-hand side of the center of the differential case 44. Rotatively mounted upon each of the spider shafts 54 is a spider pinion 55 which intermeshes upon the left-hand side with a compensating gear 56 and upon the right-hand side with a compensating gear 57. The compensating gear 56 is directly splined or otherwise suitably connected to the axle 40, whereas the compensating gear 57 is not directly connected to the axle 41 but is connected indirectly to the axle 41 through round connecting pins 59 and a drive connecting flange 58, the latter of which being splined or otherwise suitably connected to the axle 41. Non-rotatively secured to the round connecting pins 59 are pinion gears 62 which intermesh with the internal teeth 63 of the gear 49 which is non-rotatively secured to the differential case 44. Internal teeth 63 may be made in a piece separate from the gear 49, but for simplicity they are shown integral with the large driving gear that meshes with pinion 48. The compensating gear 57 comprises two parts 64 and 65 which are secured together by screws 67 and which are prevented from rotating relative to each other by means of locking pins 66, see the lower portion of the drawing in Figure 3. The pinion gears 62 are positioned between the two parts 64 and 65 at spaced circumferential intervals around the compensating gear 57.

When the wheels driven by the axles 40 and 41 have substantially the same traction, the differential mechanism in Figure 3 operates substantially like that of a conventional differential mechanism, in that power is transmitted from the differential case 44 through the spider shafts 54, spider pinions 55, the compensating gear 56 to the shaft to the axle 40 and through the compensating gear 57, the round connecting pins 59, and the drive connecting flange 58 to the said axle 41. However, when one of the axles tends to spin with reference to the other axle a relative movement is set up between the differential case 44 and the compensating gear 57. The relative movement tends to cause the internal teeth 63 to rotate the pinion gears 62, which in turn tend to rotate the round connecting pins 59 within the registering opening of the compensating gear 57 and the drive connecting flange 58. As explained with reference to the differential mechanism in Figures 1 and 2, the driving pressure upon the round connecting pins 59 tends to resist rotation of the round connecting pins which mechanically ties the compensating gear 57 to the differential case 44. The tying of the compensating gear 57 to the differential case 44 transmits power from the differential case 44 through either one of the two axles 40 or 41 even though the other axle tends to spin relative thereto. The round connecting pins 59 and the pinion gear 62 are disposed externally radially of the axle at a considerable distance so as to enable them to transmit a considerable amount of torque to the axles. The operation of the arresting or locking feature of my invention shown in Figure 3 is substantially the same as that shown and described in Figures 1 and 2 except that it is mounted upon one side of the differential center line instead of upon both sides.

There are only two conditions under which the speed of rotation between the axles and the differential case tend to change. The first condition exists when one of the wheels encounters less traction than the other and tends to cause one wheel to spin with reference to the other wheel. The second condition exists when the wheels are going around a corner. Under the second condition, there are two forces present, namely, the driving force of the power driven shaft and a secondary force generated by the wheels themselves as they go around a corner. In turning a corner, the outer wheel travels at a greater speed than the inner wheel and it is under this condition that the secondary force is generated and tends to neutralize or relieve the resistance against rotation of the round connecting pins and the pinion gears which mesh with the internal gear. As the resistance through rotation is neutralized or relieved, freedom of differential movement is permitted in rounding a curve with the differential arrangement shown in Figures 1 and 3. In other words, my invention resists differential movement when the power transmitted to the differential gears tends to spin one of the axles with reference to the other but permits free differential movement when rounding a curve.

Although I have described my invention with a certain degree of particularity, it is understood that the present disclosure has been made only by way of example and that numerous changes in the details of construction may be resorted to without departing from the spirit and the scope of the invention as hereinafter claimed.

I claim as my invention:

1. In a differential mechanism arranged to drive a pair of axles, a power driven case, differential gearing means including a spider core ring, spider pinions carried thereby and a pair of side compensating gears journalled in the case to differentially drive the axles, and additional gear means disposed to one side of the spider pinions for interconnecting at least one of the side compensating gears to the case to oppose differential movement when the power transmitted to the differential gearing means tends to spin one of the axles relative to the other axle, said additional gear means including an internal gear secured to the case and intermeshing pinion gear means secured to the said at least one of the side compensating gears, said internal gear having a diameter greater than the diameter of the spider core ring.

2. In a differential mechanism arranged to drive a pair of axles, a power driven case, differential gearing means including spider pinions and a pair of side compensating gears journalled in the case to differentially drive the axles, and additional gear means disposed to one side of the spider pinions for interconnecting at least one of the side compensating gears to the case to oppose differential movement when the power transmitted to the differential gearing means tends to spin one of the axles relative to the other axle, said additional gear means including an internal gear secured to the case and intermeshing pinion gear means secured to the said at least one of the side compensating gears, said pinion gear means being disposed radially externally of the axles.

3. In a differential mechanism arranged to drive a pair of axles, a power driven case, differential gearing means including a spider core ring, spider pinions carried thereby and a pair of side compensating gears journalled in the case to differentially drive the axles, and additional gear means interconnecting at least one of the side compensating gears to the case to oppose differential movement when the power transmitted to the differential gearing means tends to spin one of the axles relative to the other axle, said additional gear means including an internal gear secured to the case and intermeshing pinion gear means secured to the said at least one of the side compensating gears, said internal gear having a diameter greater than the diameter of the spider core ring.

4. In a differential mechanism arranged to drive a pair of axles, a power driven case, a drive plate connected to each axle, differential gearing means including a spider core ring, spider pinions carried thereby and a pair of side compensating gears journalled in the case to differentially drive the drive plates and the axles, said compensating gears and said drive plates having side surfaces disposed face-to-face and having round registering openings therein, round connecting members fitting into the registering openings and providing mechanical driving connections between the compensating gears and the drive plates, a pinion gear non-rotatively secured to the round connecting members, and an internal gear non-rotatively connected to the case and intermeshing with the pinion gears, said internal gear having a diameter greater than the diameter of the spider core ring.

5. In a differential mechanism arranged to drive a pair of axles, a power driven case, a drive plate connected to one of the axles, differential gearing means including a spider core ring, spider pinions carried thereby and a pair of side compensating gears journalled in the case to differentially drive the axles, one of said compensating gears and said drive plate having side surfaces disposed face-to-face and having round registering openings therein, round connecting members fitting into the registering openings and providing mechanical driving connections between the said one of said compensating gears and the drive plate, a pinion gear non-rotatively secured to the round connecting members, and an internal gear non-rotatively connected to the case and intermeshing with the pinion gears, said internal gear having a diameter greater than the diameter of the spider core ring.

6. In a differential mechanism arranged to drive a pair of axles, a power driven case, a drive plate connected to one of the axles, differential gearing means including a spider core ring, spider pinions carried thereby and a pair of side compensating gears journalled in the case to differential drive the axles, one of said compensating gears and said drive plate having side surfaces disposed face-to-face and having round registering openings therein, said face-to-face surfaces being adjacent to each other, round connecting members fitting into the registering openings and providing mechanical driving connections between the said one of said compensating gears and the drive plate, a pinion gear non-rotatively secured to the round connecting members, and an internal gear non-rotatively connected to the case and intermeshing with the pinion gears, said internal gear having a diameter greater than the diameter of the spider core ring.

7. In a differential mechanism arranged to drive a pair of axles, a power driven case, differential gearing means including a spider core ring, spider pinions carried thereby and a pair of side compensating gears journalled in the case to differentially drive the axles, radially extending drive connection means non-rotatively secured to one of the axles, one of said compensating gears and said drive connection means having round registering opening means therein, round connecting means fitting into the registering opening means and providing a mechanical driving connection between the compensating gear and the drive connection means, a pinion gear non-rotatively secured to the round connecting means, and a gear non-rotatively connected to the case and intermeshing with the pinion gear, said non-rotatively connected gear having a diameter greater than the diameter of the spider core ring.

8. In a differential mechanism arranged to drive a pair of axles, a power driven case, differential gearing means including spider pinions and a pair of side compensating gears journalled in the case to differentially drive the axles, radially extending drive connection means non-rotatively secured to one of the axles, one of said compensating gears and said drive connection means having round registering opening means therein, round connecting means fitting into the registering opening means and providing a mechanical driving connection between the compensating gear and the drive connection means, a pinion gear non-rotatively secured to the round connecting means, and a gear non-rotatively connected to the case and intermeshing with the pinion gear, said gear being disposed to one side of the spider pinions.

9. In a differential mechanism arranged to drive a pair of axles, a power driven case, differential gearing means including spider pinions and a pair of side compensating gears journalled in the case to differentially drive the axles, radially extending drive connection means non-rotatively secured to one of the axles, one of said compensating gears and said drive connection means having round registering opening means therein, round connecting means fitting into the registering opening means and providing a mechanical driving connection between the compensating gear and the drive connection means, a pinion gear non-rotatively secured to the round connecting means, and a gear non-rotatively connected to the case and intermeshing with the pinion gear, said gear being disposed to one side of the spider pinions and said pinion gear being disposed radially externally of the axles.

10. In a differential mechanism arranged to drive a pair of axles, a power driven shaft, a differential case, differential gearing means including spider pinions and a pair of side compensating gears journalled in the case to differentially drive the axles, gear reduction drive means interconnecting the power driven shaft and the differential case, said gear reduction drive means having a gear operating at a relatively close clearance to the differential case and in a plane substantially perpendicular to the axles and passing through one of said compensating gears to one side of the spider pinions, radially extending drive connection means non-rotatively secured to one of the axles, the other compensating gear and said drive connection means having round registering opening means therein, round connecting means fitting into the registering opening means and providing a mechanical driving connection between the said compensating gear and the drive connection means, a pinion gear non-rotatively secured to the round connecting means, and gear means non-rotatively connected to the case and intermeshing with the pinion gear, said gear means being disposed on the opposite side of the spider pinion from the said gear of the gear reduction drive and being disposed radially externally of the axles.

11. In a differential mechanism arranged to drive a pair of axles, a power driven shaft, a differential case, differential gearing means including spider pinions and a pair of side compensating gears journalled in the case to differentially drive the axles, gear reduction drive means interconnecting the power driven shaft and the differential case, said gear reduction drive means having a gear operating at a relatively close clearance to the differential case and in a plane substantially perpendicular to the axles and passing through one of said compensating gears to one side of the spider pinions, radially extending drive connection means non-rotatively secured to one of the axles, the other compensating gear and said drive connection means having round registering opening means therein, said compensating gear and said drive connection means having adjacently disposed side surfaces positioned face-to-face with respect to each other, round connecting means fitting into the registering opening means and providing a mechanical driving connection between the said compensating gear and the drive connection means, a pinion gear non-rotatively secured to the round connecting means, and gear means non-rotatively connected to the case and intermeshing with the pinion gear, said gear means being disposed on the opposite side of the spider pinion from the said gear of the gear reduction drive and being disposed radially externally of the axles.

12. In a differential mechanism arranged to drive a pair of axles, a power driven shaft, a differential case, differential gearing means including spider pinions and a pair of side compensating gears journalled in the case to differentially drive the axles, gear reduction drive means interconnecting the power driven shaft and the differential case, said gear reduction drive means having a gear operating at a relatively close clearance to the differential case and in a plane substantially perpendicular to the axles and passing through one of said compensating gears to one side of the spider pinions, and additional gear means disposed to one side of the spider pinions for interconnecting at least one of the side compensating gears to the case to oppose differential movement when the power transmitted to the differential gearing means tends to spin one of the axles relative to the other axle, said additional gear means including an internal gear secured to the case and intermeshing pinion gear means secured to the said at least one of the side compensating gears, said pinion gear means being disposed radially externally of the axles.

13. In a differential mechanism arranged to drive a pair of axles, a power driven shaft, a differential case, differential gearing means including a spider core ring, spider pinions carried thereby and a pair of side compensating gears journalled in the case to differentially drive the axles, gear reduction drive means interconnecting the power driven shaft and the differential case, said gear reduction drive means having a gear operating at a relatively close clearance to the differential case and in a plane substantially perpendicular to the axles and passing through one of said compensating gears to one side of the spider pinions, and additional gear means disposed to one side of the spider pinions for interconnecting at least one of the side compensating gears to the case to oppose differential movement when the power transmitted to the differential gearing means tends to spin one of the axles relative to the other axle, said additional gear means including a gear non-rotatively secured to the case and intermeshing pinion gear means secured to the said at least one of the side compensating gears, said non-rotatively secured gear having a diameter greater than the diameter of the spider core ring.

FRANCIS H. BOOR.